(12) United States Patent
Noordhuis

(10) Patent No.: US 7,836,818 B2
(45) Date of Patent: Nov. 23, 2010

(54) BEVERAGE MAKING DEVICE COMPRISING A FROTHING MEMBER

(75) Inventor: Joeke Noordhuis, Hoogeveen (NL)

(73) Assignee: Koninklijke Philips Electronics N. V., Eindhoven (NL)

(*) Notice: Subject to any disclaimer, the term of this patent is extended or adjusted under 35 U.S.C. 154(b) by 910 days.

(21) Appl. No.: 10/568,835

(22) PCT Filed: Aug. 5, 2004

(86) PCT No.: PCT/IB2004/051402

§ 371 (c)(1), (2), (4) Date: Feb. 17, 2006

(87) PCT Pub. No.: WO2005/016095

PCT Pub. Date: Feb. 24, 2005

(65) Prior Publication Data

US 2006/0230942 A1 Oct. 19, 2006

(30) Foreign Application Priority Data

Aug. 19, 2003 (EP) .................................. 03102590

(51) Int. Cl.
*A47J 31/40* (2006.01)
*A47J 31/06* (2006.01)

(52) U.S. Cl. ..................... 99/295; 99/302 R; 426/433

(58) Field of Classification Search ............. 99/295, 99/302 R; 426/433
See application file for complete search history.

(56) References Cited

U.S. PATENT DOCUMENTS

| 5,265,519 A | * | 11/1993 | Schiettecatte et al. ......... 99/293 |
| 6,009,792 A | * | 1/2000 | Kraan ........................ 99/295 |
| 6,412,394 B2 | * | 7/2002 | Bonanno ..................... 99/299 |
| 6,840,158 B2 | * | 1/2005 | Cai .......................... 99/323.1 |
| 7,591,217 B2 | * | 9/2009 | Kodden et al. ............ 99/302 R |
| 2004/0094472 A1 | * | 5/2004 | Brouwer ..................... 210/469 |
| 2004/0112223 A1 | * | 6/2004 | De'Longhi ................... 99/279 |
| 2005/0155494 A1 | * | 7/2005 | Brouwer et al. ............... 99/279 |
| 2007/0137493 A1 | * | 6/2007 | Van Der Meer et al. ....... 99/279 |

FOREIGN PATENT DOCUMENTS

| EP | 1092377 | | 4/2001 |
| EP | 1125535 | A2 | 8/2001 |
| WO | 0291889 | A2 | 11/2002 |
| WO | 0355366 | A2 | 7/2003 |

* cited by examiner

Primary Examiner—Reginald L Alexander

(57) ABSTRACT

A beverage making device comprising a frothing member (9) for producing froth in the beverage, which device comprises a settling chamber (11) for settling the frothed beverage coming from the frothing member (9). The coarse foam is separated from the fine foam thereby. The outlet (14) for the settled beverage is at the lower side of the settling chamber (11).

11 Claims, 1 Drawing Sheet

BEVERAGE MAKING DEVICE COMPRISING A FROTHING MEMBER

Figure 1:
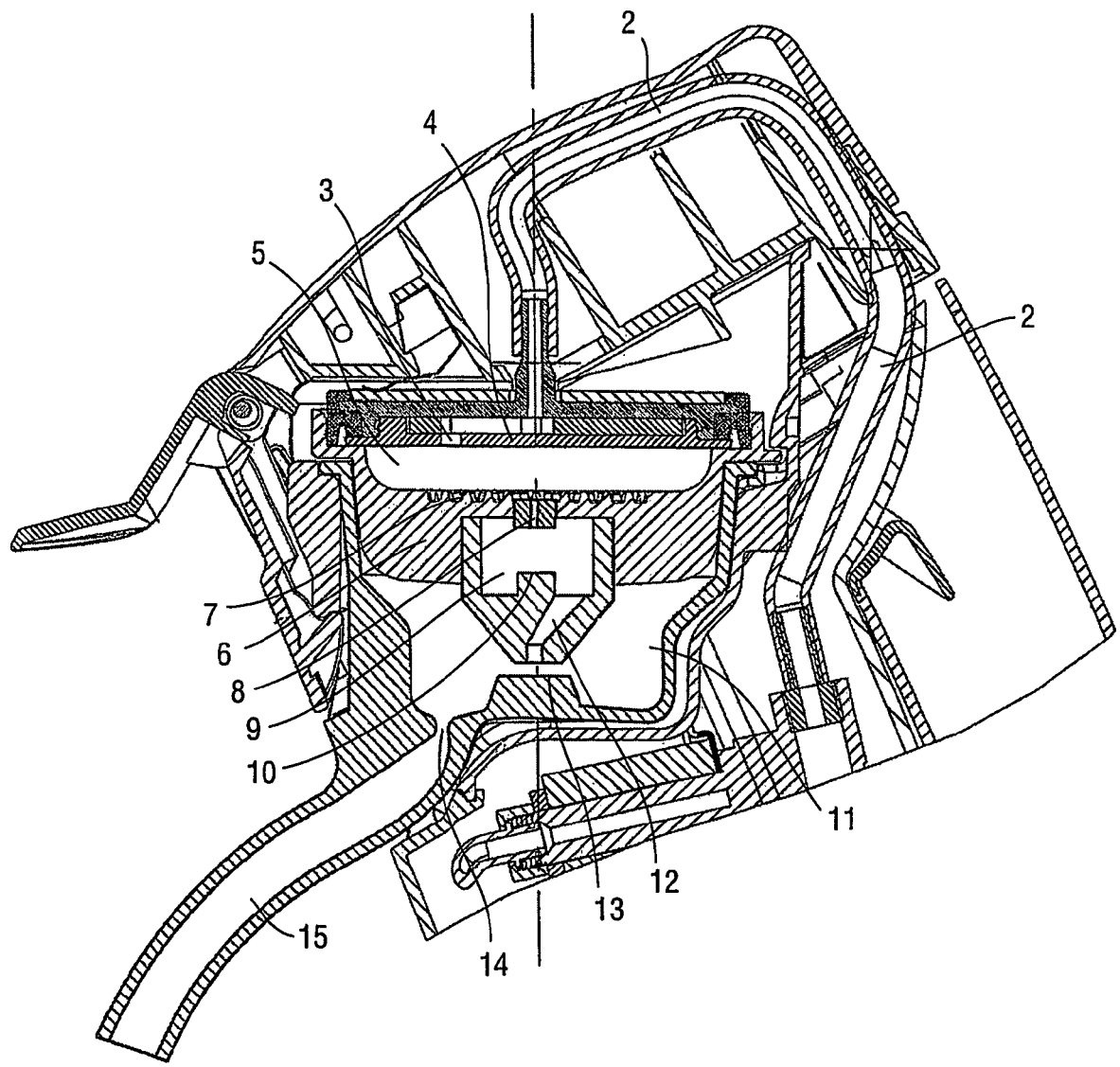

The invention relates to a beverage making device comprising a frothing member for producing froth in the beverage. A beverage can be made by means of the device in an extraction process, for example to produce coffee, or in a dissolving process, for example to produce a chocolate drink.

Such a device is disclosed in EP-A-1092377, which publication describes a device for making coffee comprising a brewing chamber in which a pad containing ground coffee can be placed. The coffee is extracted by hot water supplied through holes in the upper wall of the brewing chamber. The hot water passes through the pad, and the brewed beverage (coffee extract) is collected at the central portion of the bottom of the brewing chamber and is injected into a frothing chamber through a nozzle in the bottom of the brewing chamber. The coffee extract is thus injected into the coffee extract that had previously entered the frothing chamber, so that air is mixed with the coffee extract and froth (foam) is created. Subsequently the frothed coffee extract is guided by outflow means to outside the device, where one or two cups to be filled with the frothed coffee extract are present. The coffee in the cups will have a froth layer on top.

As described in EP-A-1092377, the stability of the froth can be enhanced by the creation fine-bubble froth (i.e. fine foam) without large air bubbles (i.e. a mono-dispersed distribution of small bubble sizes). The larger air bubbles grow via Ostwald ripening and break up soon, causing the entire froth layer to become unstable by broadening the size distribution further, and they dissolve rapidly by creating shock waves. However, it is difficult to avoid the creation of larger air bubbles (i.e. coarse foam) in the froth. Even when the amount of larger air bubbles is minimized, a small quantity of large air bubbles in the froth layer on the coffee may result in a rapid disappearance of the entire froth layer.

The object of the invention is to provide a stable froth layer on the beverage produced by the beverage making device by avoiding larger air bubbles in the froth layer.

To accomplish that object, the device comprises a settling chamber for settling the frothed beverage coming from the frothing member, the outlet for the settled beverage being at the lower side of said settling chamber. If the frothed beverage is buffered for some time in the settling chamber, the larger air bubbles will move in upward direction with respect to the smaller air bubbles, so that the coarse foam comes to rest above the fine foam. Since the outlet of the settling chamber is located at the lower side, i.e. at the bottom of the settling chamber, the coarse foam will stay behind in the settling chamber until all coffee extract, including the fine foam, has left the settling chamber. By that time the largest air bubbles will have become dissolved.

In one preferred embodiment, the device comprises a brewing chamber for brewing the beverage, means for feeding hot water into said brewing chamber, and nozzle means for supplying the brewed beverage to the frothing member, as described above. The nozzle means can thus inject the beverage into the frothing member, so that froth is created by the turbulence, i.e. air is mixed with the beverage.

It is important that the beverage in the settling chamber should come to a relative rest. Such a condition of rest may be achieved by waiting some time, but preferably the rest is the result of the way in which the frothed beverage is introduced into the settling chamber. The inlet for supplying the frothed beverage into the settling chamber is then preferably located near the expected upper surface of the beverage in the settling chamber, so that the inflow of the beverage does not cause heavy turbulence.

In one preferred embodiment, the frothed beverage is guided along a guiding surface in the settling chamber. Such a guiding surface avoids much turbulence when the incoming beverage comes into contact with the beverage that is already present in the settling chamber. The guiding surface may be a located in the central portion of the settling chamber and is preferably a substantially horizontal surface, which surface is preferably located just above the expected upper surface of the beverage in the settling chamber. The frothed beverage can thus enter the settling chamber though a central inlet in the upper wall of the settling chamber, which is an advantageous location if the settling chamber is located underneath the frothing member.

In another preferred embodiment the guiding surface is a portion of the surface of the side wall of the settling chamber. In this case the inlet for feeding the frothed beverage into the settling chamber may direct its outflow against the side wall of the settling chamber, so that the beverage flows along the surface of the side wall to the beverage that is already present in the settling chamber.

Preferably, the outlet of the settling chamber has an opening of less than 4 mm$^2$, preferably an opening of less than 2 mm$^2$. The restriction in the outlet of the settling chamber has two functions. Firstly it increases the time that the beverage remains in the settling chamber, and secondly it avoids that the largest air bubbles can pass the outlet. The outlet preferably has a substantially round opening.

Outflow means may extend outside the device in order to guide the beverage to one or two cups. The outflow means then guide the beverage from the frothing member over a certain distance to the outflow opening outside the device, and the settling chamber may form an integral part of said outflow means.

In one preferred embodiment, part of the device can be removed from the remainder of the device, said part comprising the frothing member, the settling chamber, and the outflow means for guiding the beverage to outside the device.

The invention also relates to a method of making a beverage by means of a beverage making device comprising a frothing member for producing froth in the beverage, wherein the frothed beverage is guided into a settling chamber for settling the frothed beverage, and wherein the settled beverage is guided from the settling chamber through an outlet at the lower side of the settling chamber.

The invention will now be further explained by means of a description of an embodiment of a device for making coffee, in which reference is made to the drawing comprising a FIGURE that shows a sectional view of a portion of the device.

The FIGURE shows the relevant part (i.e. the uppermost portion) of a device for making coffee. The other part of the device, which is not shown, comprises a water container and means for heating the water and pumping a predetermined quantity of the heated water through a tube 2 to a number of holes 3 in the upper wall 4 of a brewing chamber 5. The sectional view of the FIGURE only shows one hole 3 in the upper wall 4, but there are more holes, spread out over the surface of the upper wall 4.

Brewing chamber 5 has a substantially cylindrical shape that fits a disc-like pad (not shown) containing, for example, ground coffee. The coffee is extracted by a supply of hot water under pressure through the holes 3, so that the water passes said disc-like pad.

The lower wall 6 of the brewing chamber 5 is provided with a profile 7 so as to form canals for allowing the brewed coffee to arrive at the central portion of the bottom of the brewing chamber 5, where outflow means in the form of nozzle 8 are located. Nozzle 8 is attached to the lower wall 6 by a screw thread. The coffee extract passes through the nozzle 8, which causes a liquid jet in downward direction into a frothing chamber 9, because of the relatively high liquid pressure in the brewing chamber 5.

Frothing chamber 9 is provided with a central horizontal plateau 10. The liquid jet coming from the nozzle 8 strikes against the plateau 10, so that the coffee extract is splashed against the side wall of the frothing chamber 9. The coffee extract is mixed with air thereby, and the resulting turbulence creates air bubbles in the coffee extract. Subsequently the coffee extract, including the air bubbles, flows into a settling chamber 11, where the coffee extract comes to rest, so that the larger air bubbles will rise above the smaller air bubbles.

The coffee extract is supplied from the frothing chamber 9 to the settling chamber 11 through an inlet 12. The outflow opening of inlet 12 is located near a horizontal guiding surface 13 in the central portion of the settling chamber 11. The level of the guiding surface 13 is a little higher than the expected highest level of the coffee extract in the settling chamber 11, so that the guiding surface 13 will guide the coffee extract from said opening of inlet 12 to the coffee extract that is already in the settling chamber, without causing turbulence in the coffee extract.

Instead of against the horizontal guiding surface 13, the inlet of the settling chamber may direct incoming frothed coffee extract against a side wall or another wall of the settling chamber. It was found in all cases that turbulence in the settling chamber can be avoided by making use of a guiding surface for guiding the coffee extract into the liquid in the settling chamber.

It was found that the foam in the coffee extract will separate into fine foam in the lower part of the settling chamber 11 and coarse foam on top of the fine foam within a short time. The outlet 14 of the settling chamber 11 is located at the lower side of that chamber, so that the coffee extract with the fine foam (i.e. the small air bubbles) will flow through it, whereas the coarse foam (i.e. the larger air bubbles) will remain in the settling chamber. It was found in practice that the coarse foam will not pass the outlet 14, because the major portion thereof has disappeared before the settling chamber 11 is empty, and the remainder of the coarse foam disappears when it tries to pass the outlet opening 14.

The diameter of the outlet opening 14 is limited so as to form a restriction, so that the coffee extract is buffered for a short time in the settling chamber 11. After passing the outlet opening 14, the coffee extract with the fine foam flows through outflow means 15 to outside the device, where it can be caught by a cup (not shown). A foam layer of relatively fine air bubbles will be on top of the coffee extract in the cup.

The embodiment as described above is only an example; a great many other embodiments are possible.

The invention claimed is:

1. A beverage making device comprising a frothing member for producing froth in the beverage and an outflow means for guiding the beverage outside the device, wherein the device comprises a settling chamber for allowing the frothed beverage coming from the frothing member to settle, and in that the outlet for the settled beverage is at the lower side of the settling chamber, wherein a size of the outlet is limited so as to form a restriction which has a smaller diameter than the outflow means, wherein the outlet forms an entrance of the outflow means, and wherein the frothed beverage is guided along a guiding surface in a central portion of the settling chamber.

2. A beverage making device as claimed in claim 1, wherein the device comprises a brewing chamber for brewing the beverage, means for feeding hot water into said brewing chamber, and a nozzle for supplying the brewed beverage to the frothing member.

3. A beverage making device as claimed in claim 1, wherein the beverage is injected into the frothing member.

4. A beverage making device as claimed in claim 1, wherein an inlet for supplying the frothed beverage to the settling chamber is located near the expected upper surface of the beverage in the settling chamber.

5. A beverage making device as claimed in claim 1, wherein the guiding surface is preferably a substantial horizontally surface.

6. A beverage making device as claimed in claim 1, wherein the guiding surface is a portion of the surface of the side wall of the settling chamber.

7. A beverage making device as claimed in claim 1, wherein said outlet is less than 4 mm$^2$.

8. A beverage making device as claimed in claim 1, wherein said outlet has a substantially circular opening.

9. A beverage making device as claimed in claim 1, wherein part of the device can be removed from the remainder of the device, said part comprising the frothing member, the settling chamber, and the outflow means.

10. A beverage making device as claimed in claim 1, wherein said outlet is less than 2 mm$^2$.

11. A method of making a beverage by means of a beverage making device comprising a frothing member for producing froth in the beverage and an outflow means for guiding the beverage outside the device, wherein the frothed beverage is guided into a settling chamber for settling the frothed beverage, and in that the settled beverage is guided out of the settling chamber through an outlet at the lower side of the settling chamber, wherein a size of the outlet is limited so as to form a restriction which has a smaller diameter than the outflow means, wherein the outlet forms an entrance of the outflow means, and wherein the frothed beverage is guided along a guiding surface in a central portion of the settling chamber.

* * * * *